United States Patent
Zheng

(10) Patent No.: US 12,461,601 B2
(45) Date of Patent: Nov. 4, 2025

(54) BLUETOOTH KEYBOARD WITH A PROTECTIVE CASE FOR A TABLET PC

(71) Applicant: Shenzhen Manwei Internet Co., Ltd., Shenzhen (CN)

(72) Inventor: Xiaomei Zheng, Shenzhen (CN)

(*) Notice: Subject to any disclaimer, the term of this patent is extended or adjusted under 35 U.S.C. 154(b) by 207 days.

(21) Appl. No.: 18/346,225

(22) Filed: Jul. 1, 2023

(65) Prior Publication Data

US 2024/0411379 A1 Dec. 12, 2024

(30) Foreign Application Priority Data

Jun. 8, 2023 (CN) .......................... 202321455709.1

(51) Int. Cl.
G06F 3/02 (2006.01)
G06F 1/16 (2006.01)
G06F 3/023 (2006.01)
H04B 1/3888 (2015.01)

(52) U.S. Cl.
CPC .......... G06F 3/0202 (2013.01); G06F 1/1669 (2013.01); G06F 3/0231 (2013.01); H04B 1/3888 (2013.01)

(58) Field of Classification Search
None
See application file for complete search history.

(56) References Cited

U.S. PATENT DOCUMENTS

| | | | | |
|---|---|---|---|---|
| 2004/0083577 A1* | 5/2004 | Lu | ........................... | G06F 1/162 16/367 |
| 2006/0282985 A1* | 12/2006 | Lu | ........................ | G06F 1/1681 16/367 |
| 2008/0078060 A1* | 4/2008 | Chen | ..................... | G06F 1/1681 16/367 |
| 2009/0121094 A1* | 5/2009 | Chang | .................. | G06F 1/1681 248/125.7 |
| 2010/0043175 A1* | 2/2010 | Wang | ...................... | G06F 1/162 16/343 |
| 2011/0041634 A1* | 2/2011 | Kim | ....................... | G06F 1/1615 74/100.1 |
| 2013/0162128 A1* | 6/2013 | Yu | ........................ | H05K 5/0247 312/223.1 |
| 2013/0178155 A1* | 7/2013 | Shulenberger | ........ | G06F 1/1632 455/73 |

FOREIGN PATENT DOCUMENTS

CN 202659117 U * 1/2013 ............. E06B 9/326

OTHER PUBLICATIONS

CN 202659117 U (Song) (Year: 2013)—Machine Translation.*

* cited by examiner

*Primary Examiner* — Allen L Parker
*Assistant Examiner* — Elisa Sasserath

(57) ABSTRACT

A Bluetooth keyboard with a protective case for a tablet PC is disclosed, including a keyboard body, a protective case for fixed installation of the tablet PC, a swivel base, and a locking member. The keyboard body is provided with a positioning sleeve, a lower end of the swivel base is configured to be rotatably inserted in the positioning sleeve and rotatable relative to the positioning sleeve around a first axis of rotation. The locking member is removably mounted in the mounting slot and is configured to be embedded in the inset slots. The Bluetooth keyboard has a two-way rotation function, which can adjust orientations of screen of the tablet PC fixed on the protective case to improve the flexibility of use, and makes the configuration more simple, easy to install, and can reduce production costs.

12 Claims, 5 Drawing Sheets

BLUETOOTH KEYBOARD WITH A PROTECTIVE CASE FOR A TABLET PC

TECHNICAL FIELD

The present application relates to the field of protective case, and specifically to a Bluetooth keyboard with a protective case for a tablet PC.

BACKGROUND

An existing Bluetooth keyboard with a protective case for a tablet PC includes a keyboard body, and a protective case for fixed installation of the tablet PC. The protective case is horizontally rotatable on the keyboard body by a horizontal axis, so that the protective case may be opened and closed by rotating around the horizontal axis relative to the keyboard body. However, the protective case may only be rotated around the horizontal axis with respect to the keyboard body, but not around a vertical axis, making it impossible to adjust orientations of the screen of the tablet PC fixed on the protective case, thus limiting its flexibility of use. In order to solve above problems, although recent emergence of improved Bluetooth keyboard with the protective case for the tablet PC on the market, which has function of bi-directional rotation to improve the flexibility of use, but the improved Bluetooth keyboard with the protective case for the tablet PC has a more complex structure, more inconvenient installation, resulting in higher costs, far from meeting high requirements of the industry.

SUMMARY

An objective of the present disclosure is to provide a Bluetooth keyboard with a protective case for a tablet PC to address shortcomings of existing technologies. The Bluetooth keyboard makes the protective case rotate around a first axis of rotation with a swivel base, and makes the protective case rotate around a second axis of rotation with respect to the swivel base, which can improve the flexibility of use, meanwhile also making a structure simpler and easier to install, and also can reduce production costs.

The objective of the present disclosure is achieved by using following technical solutions.

In some embodiments, a Bluetooth keyboard with a protective case for a tablet PC is provided, including a keyboard body, a protective case for fixed installation of the tablet PC, a swivel base, and a locking member. The keyboard body is provided with a positioning sleeve, a lower end of the swivel base is configured to be rotatably inserted in the positioning sleeve and rotatable relative to the positioning sleeve around a first axis of rotation. The positioning sleeve is provided with a plurality of inset slots arranged in a circular pattern around the first axis of rotation, and the swivel base is provided with a mounting slot. The locking member is removably mounted in the mounting slot and is configured to be embedded in the inset slots. The mounting slot is fitted with a resilient element, the resilient element against on the locking member and is configured to provide a resilient force to move the locking member toward the positioning sleeve. The protective case is provided with a supporting member, the supporting member being configured to be rotatably mounted on the swivel base and rotatable relative to the swivel base about a second axis of rotation. The first axis of rotation is a vertical axis, and the first axis of rotation is configured to be perpendicular to the second axis of rotation.

In some embodiments, the locking member is a locking pin, the locking pin being configured with a pin head having a triangular cross-section and being embedded in the inset slots, and the inset slots having a shape matching a shape of the pin head.

In some embodiments, the locking member is a marble.

In some embodiments, a portion of the positioning sleeve located between any two adjacent inset slots is formed as an abutting portion for abutting the locking member.

In some embodiments, the resilient element is a spring, one end of the resilient element against on a slot wall of the mounting slot and the other end of the mounting slot against on the locking member.

In some embodiments, an end of the keyboard body provided with the positioning sleeve is configured to protrude outwardly relative to the protective case.

In some embodiments, the supporting member includes a support shaft fixed to the protective case, the support shaft is provided with a limit part and a limit member, the swivel base is provided with an engaging lug, the support shaft is configured to be rotatably inserted on the engaging lug and the engaging lug is configured to be clamped between the limit part and the limit member, and a central axis of the support shaft is formed as the second axis of rotation.

In some embodiments, the limit member includes a fastener attached to the support shaft in a detachable manner, and a plurality of resilient washers mounted on the support shaft and located between the engaging lug and the fastener.

In some embodiments, the limit member further includes a first washer and a second washer sleeved on the support shaft, the first washer is located between the engaging lug and the resilient washers adjacent thereto, and the second washer is located between the fastener and the resilient washers adjacent thereto.

In some embodiments, the keyboard body is a Bluetooth keyboard body.

Compared with the existing technologies, the present disclosure has following advantages.

The Bluetooth keyboard with the protective case for the tablet PC provided by the present disclosure is designed by using a combination configuration of the keyboard body, the protective case, the swivel base, the locking member, the positioning sleeve, and the resilient element. By such designs, the protective case can rotate around the first axis of rotation along with the swivel base, and make the protective case rotate around the second axis of rotation with respect to the swivel base, and also adjust the orientations of the screen of the tablet PC fixed on the protective case to improve the flexibility of use, thereby making the structure simpler and easier to install, which can reduce production costs.

Figure 1:
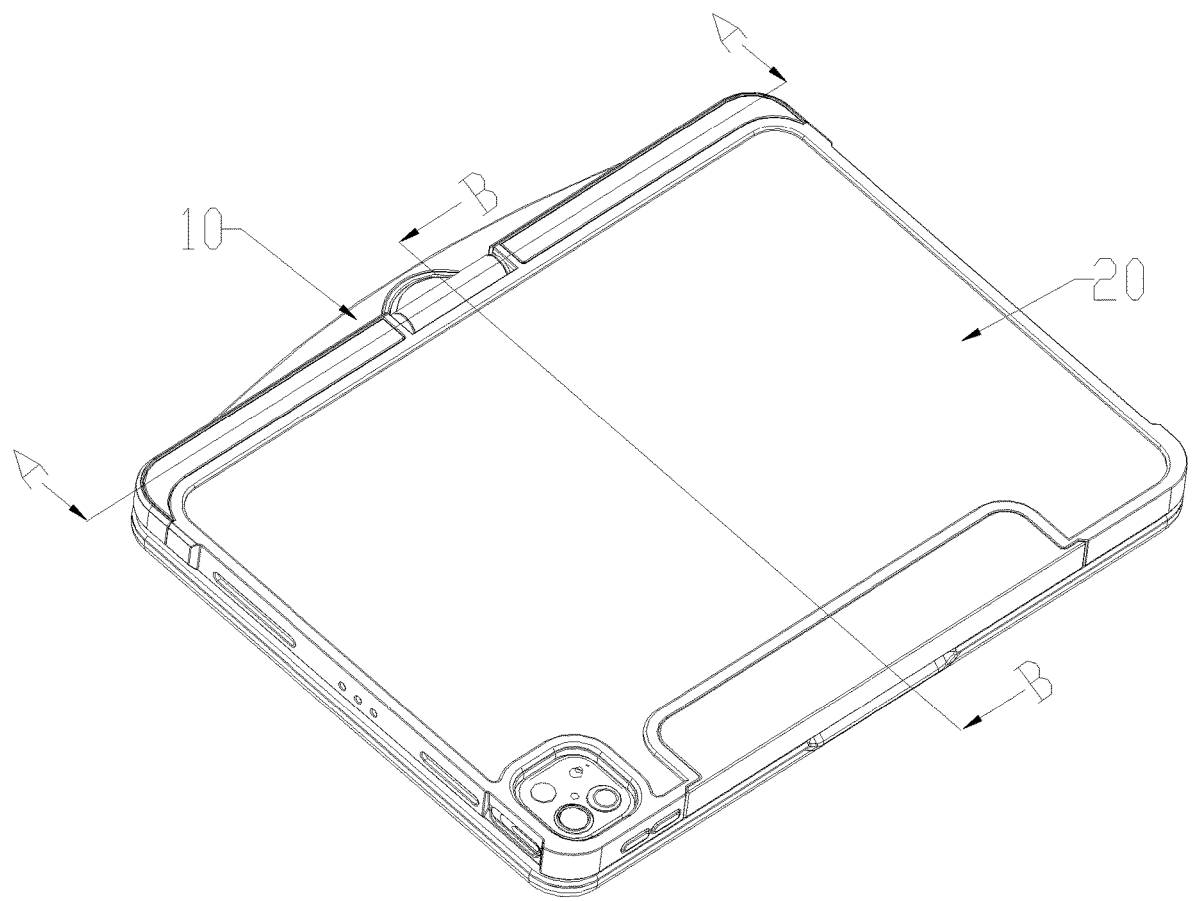
FIG. 1 shows a structural schematic diagram of a Bluetooth keyboard with a protective case for a tablet PC in accordance with some embodiments of the present disclosure.

In the drawings, the reference signs are as follows. 10 keyboard body, 20 protective case, 30 swivel base, 31 engaging lug, 40 locking member, 41 mounting slot, 42 pin head, 43 locating slot, 50 positioning sleeve, 51 inset slots, 52 abutting portion, 60 resilient element, 70 supporting member, 71 support shaft, 72 limit part, 80 limit member, 81 fastener, 82 resilient washers, 83 first washer, 84 second washer.

DETAILED DESCRIPTION OF THE EMBODIMENTS

Hereinafter, the present disclosure is further described in conjunction with accompanying drawings and specific embodiments. It is to be noted that new embodiments may be formed in any combination between the embodiments described below or between the technical features, provided that they do not conflict with each other.

Figure 2:
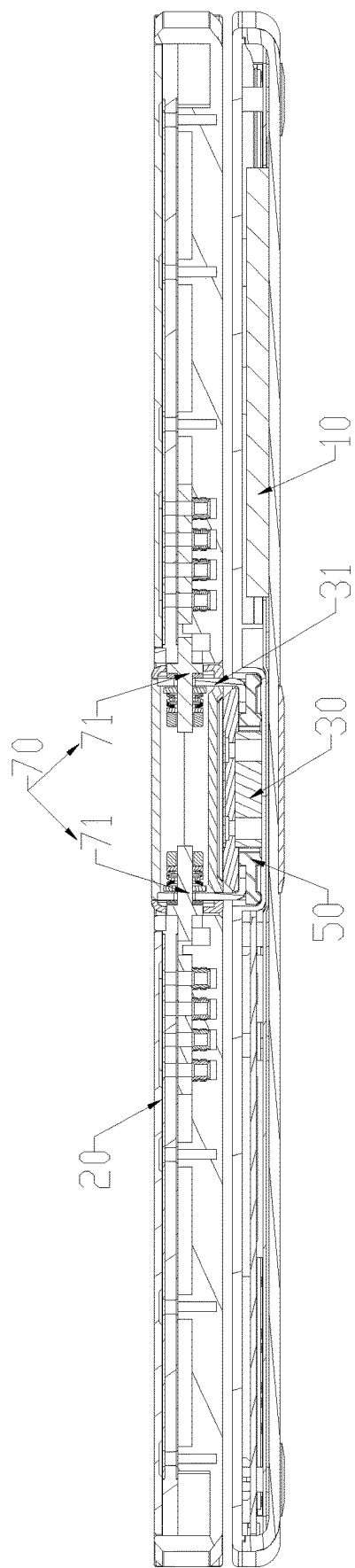
FIG. 2 shows an A-A oriented sectional view of FIG. 1.
Figure 3:
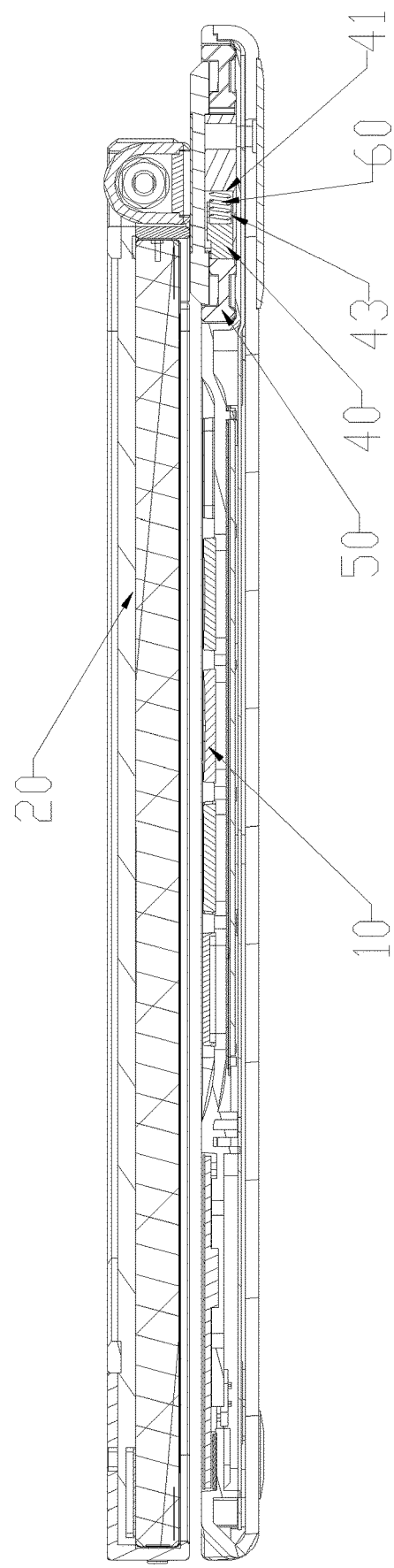
FIG. 3 shows a B-B oriented sectional view of FIG. 1.
Figure 4:
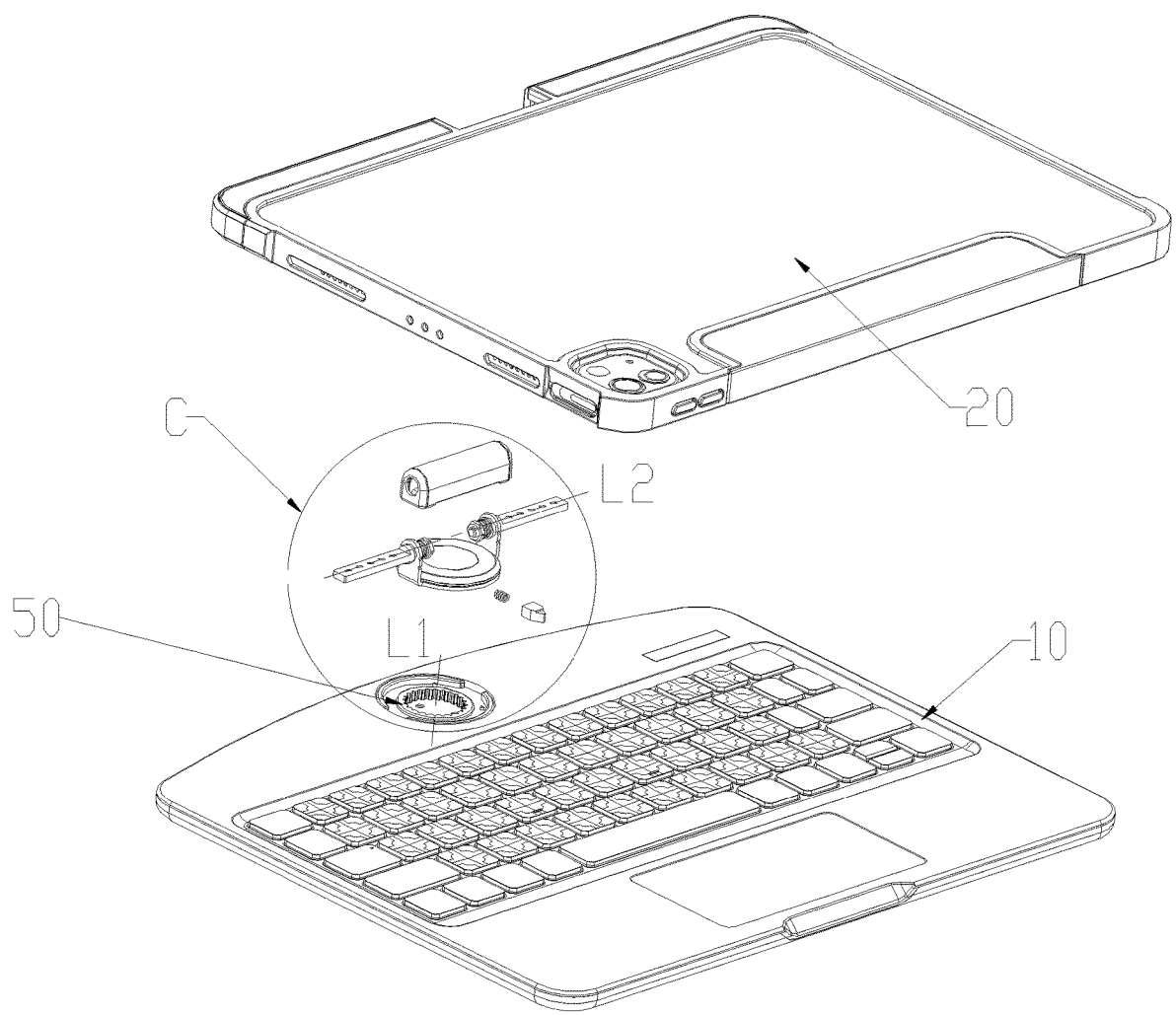
FIG. 4 shows an exploded view of the Bluetooth keyboard with the protective case for the tablet PC in accordance with some embodiments of the present disclosure.
Figure 5:
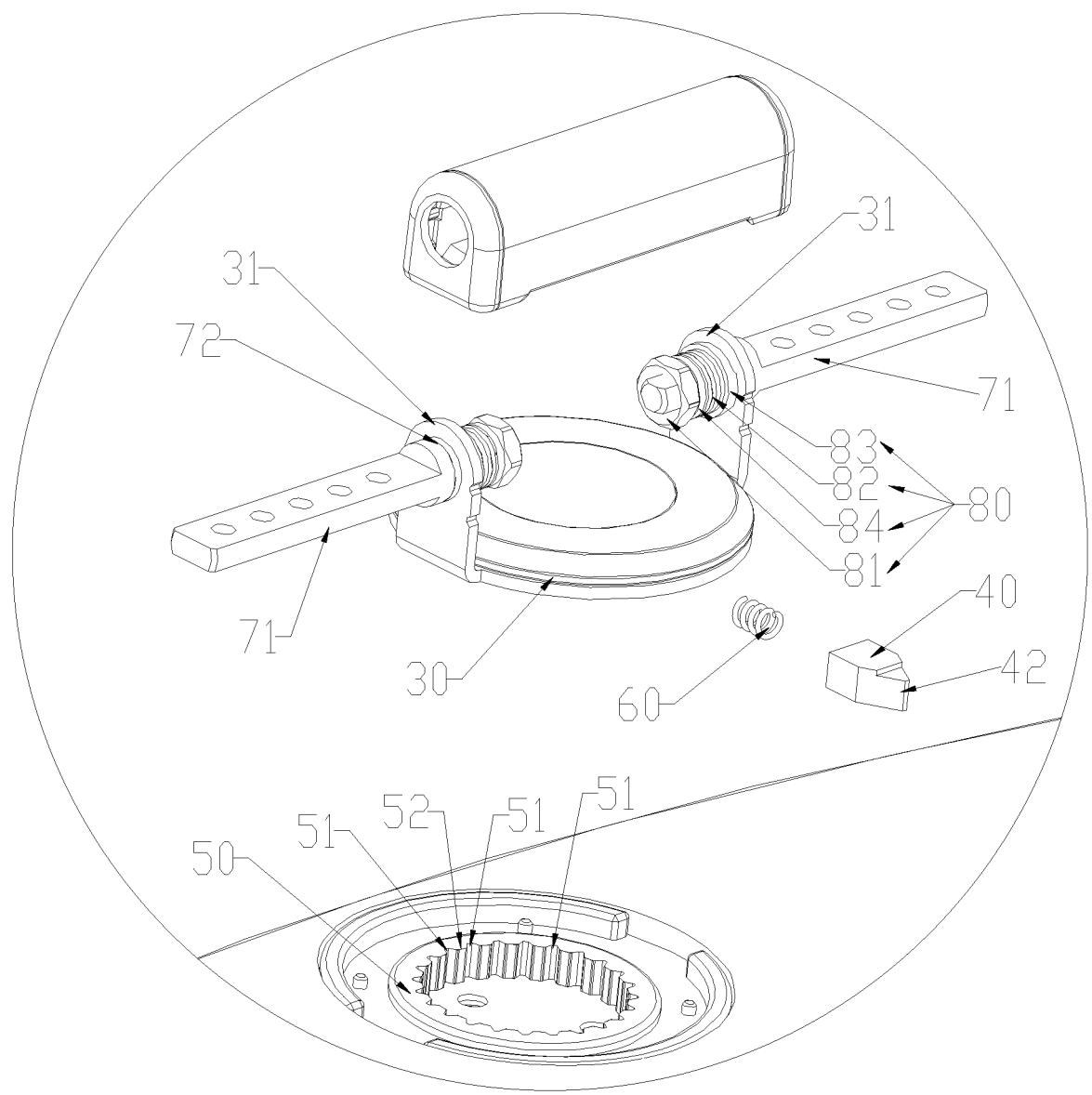
FIG. 5 shows an enlarged view of FIG. 4 at C part.

As shown in FIG. 1 to FIG. 5, in some embodiments, a Bluetooth keyboard with a protective case for a tablet PC is provided, including a keyboard body 10, a protective case 20 for fixed installation of the tablet PC, a swivel base 30, and a locking member 40. The keyboard body 10 is provided with a positioning sleeve 50, a lower end of the swivel base 30 is configured to be rotatably inserted in the positioning sleeve 50 and rotatable relative to the positioning sleeve 50 around a first axis of rotation L1. The positioning sleeve 50 is provided with a plurality of inset slots 51 arranged in a circular pattern around the first axis of rotation L1, and the swivel base 30 is provided with a mounting slot 41. The locking member 40 is removably mounted in the mounting slot 41 and is configured to be embedded in the inset slots 51. The mounting slot 41 is fitted with a resilient element 60, the resilient element 60 against on the locking member 40 and is configured to provide a resilient force to move the locking member 40 toward the positioning sleeve 50. The protective case 20 is provided with a supporting member 70, the supporting member 70 being configured to be rotatably mounted on the swivel base 30 and rotatable relative to the swivel base 30 about a second axis of rotation L2. The first axis of rotation L1 is a vertical axis, and the first axis of rotation L1 is configured to be perpendicular to the second axis of rotation L2. Specifically, a central axis of the positioning sleeve 50 is formed as the first axis of rotation L1.

In use, the tablet PC is fixedly mounted on the protective case 20, and the protective case 20 together with the supporting member 70 is rotated around the second axis of rotation relative to the swivel base 30 by applying a pushing force, to open and close the protective case 20. If an angle of the tablet PC's screen needs to be adjusted, the protective case 20 and the swivel base 30 may be pushed around the first axis of rotation, so that the swivel base 30 rotates around the first axis of rotation within the positioning sleeve 50. At this time, the locking member 40 rotates with the swivel base 30, and when the swivel base 30 rotates to a corresponding angle, the locking member 40 moves toward the positioning sleeve 50 under the resilient force of the resilient element 60 and is configured to be embedded in corresponding inset slots 51, so that the protective case 20 and the tablet PC remain at the corresponding viewing angle. Thus, the Bluetooth keyboard with the protective case for the tablet PC provided by the present disclosure is designed by using a combination configuration of the keyboard body 10, the protective case 20, the swivel base 30, the locking member 40, the positioning sleeve 50, and the resilient element 60. By such designs, the protective case 20 can rotate around the first axis of rotation along with the swivel base, and make the protective case 20 rotate around the second axis of rotation with respect to the swivel base, and also adjust the orientations of the screen of the tablet PC fixed on the protective case 20, thereby increasing the flexibility of use. Moreover, during installation, only supporting member 70 needs to be installed on the swivel base 30 and set on the protective case 20, and then the swivel base 30 mounted with the resilient element 60 and the locking member 40 is matched with the positioning sleeve 50 to installation, making the structure simpler and easier to install, which can save installation cost and installation time to reduce production cost.

In the embodiments, the keyboard body 10 is provided with a positioning sleeve 50, an end of the positioning sleeve 50 protruding outward relative to the protective case 20.

The resilient element 60 is a spring. One end of the resilient element 60 is configured to rest against a slot wall of the mounting slot 41 and other end is configured to rest against the locking member 40.

Of course, in addition, the resilient element 60 may also be a resilient sheet, etc., but using spring as the resilient element 60 is an optimal implementation of the present disclosure, which can reduce the cost and facilitate the installation.

The locking member 40 is provided with a locating slot 43 for embedding the resilient element 60 to facilitate the installation and positioning of the resilient element 60.

A part of the positioning sleeve 50 located between any two adjacent inset slots 51 is formed as an abutting portion 52 for the locking member 40 to rest against. When the locking member 40 moves from the inset slots 51 to an adjacent abutting portion 52 as the rotation of the swivel base 30, the locking member 40 is moved backwards into the mounting slot 41 by the abutting portion 52, the spring is in compression. When the locking member 40 moves from the abutting portion 52 to adjacent inset slots 51 as the swivel base 30 rotates, the spring resiliently recovers and the locking member 40 moves toward the positioning sleeve 50 and embedded in the corresponding inset slots 51 by the resilient force of the spring.

The locking member 40 is a locking pin, the locking pin having a triangular cross-section and a pin head 42 for insertion in the inset slots 51. A shape of the inset slots 51 matches a shape of the pin head 42. By using the above structures, the locking member 40 can be easily embedded in and removed from the inset slots 51.

Of course, in addition to this, the locking member 40 may also be adopt a column core, a sphere, etc., and an another preferred embodiment of the present disclosure, the locking member 40 may adopt a marble, so that when the locking member 40 moves from the abutting portion 52 to the adjacent inset slots 51 with the rotation of the swivel base 30, the marble may rebound under the resilient force of the spring and embed into the corresponding inset slots 51, and the slot walls of the inset slots 51 collide with a sound, which is convenient for the user to understand the rotation of the swivel base 30 together with the protective case 20 according to the sound, improving the use experience.

The supporting member 70 includes a supporting shaft 71 fixed to the protective case 20, the supporting shaft 71 is provided with a limit part 72 as well as a limit member 80, the swivel base 30 is provided with an engaging lug 31, the support shaft 71 being configured to be rotatably inserted on the engaging lug 31, and the engaging lug 31 being configured to be clamped between the limit part 72 and the limit member 80, a central axis shape of the support shaft 71 being configured as the second axis of rotation. And by pushing the protective case 20 together with the support shaft 71 around the second axis of rotation relative to the engaging lug 31 of the swivel base 30, the rotation angle of the protective case can be adjusted around the second axis of rotation, and when the protective case 20 is rotated in place, the friction between the engaging lug 31 and the limit part 72 and the limit member 80 (or between the engaging lug 31 and the limit part 72 and the limit member 80, and between the support shaft 71 and the engaging lug 31) keeps the protective case 20 at the position of the corresponding opening and closing angle.

The limit member 80 includes a fastener 81 attached to the support shaft 71 in a detachable manner, and a plurality of resilient washers 82 mounted on the support shaft 71 and located between the engaging lug 31 and the fastener 81. The limit member 80 further includes a first washer 83 and a second washer 84 sleeved on the support shaft 71, the first washer 83 being located between the engaging lug 31 and the resilient washers 82 adjacent to the engaging lug 31, the second washer 84 being located between the fastener 81 and the resilient washers 82 adjacent to the fastener 81.

Herein the fastener 81 may be a locknut threaded onto the support shaft 71, or a snap ring snap-fitted onto the support shaft 71, etc. . . .

The limit part 72 includes a shaft shoulder set on the support shaft 71, and a third washer located between the shaft shoulder and the engaging lug 31 to facilitate installation and fabrication. Of course, in addition to this, the limit part 72 can also be a snap ring set on the support shaft 71 etc., but the limit part 72 adopts the shaft shoulder and the third washer, which is an optimal implementation of the present disclosure and can facilitate installation and fabrication.

In the embodiments, the supporting member 70 includes two support shafts 71 fixed to the protective case 20 and disposed in opposite directions, the two support shafts 71 have overlapping central axes, the swivel base 30 is provided with two engaged lugs 31 corresponding to each of the two support shafts 71, and the support shaft 71 is rotatably inserted on a corresponding engaging lug 31 to improve the stability of the rotation of the protective case 20.

Herein material of the keyboard body's 10 shell and the protective case 20 can be set according to actual needs, as a further preferred implementation of the present disclosure, the keyboard body's 10 shell, the protective case 20 can be set to transparent shiny, and can outwardly show the keyboard body 10 components, formation of cyberpunk wind, and also can improve an appearance of the effect. Of course, it can be made into keyboard body with a variety of color changes, light flashing effect and so on.

Specifically, the mounting slot 41 extends radially along the swivel base 30.

In the embodiments, the swivel base 30 includes a support disc, a round wheel fixed to the support disc and inserted in the positioning sleeve 50, and a connecting framing fixed to the support disc, the mounting slot 41 being set on the round wheel, and the engaging lug 31 being set on the connecting frame and extending upwards. By using the above structures, it is possible to facilitate making of the swivel base 30.

Of course, in addition to this, other structures may be used for the swivel base 30, but a combination of the swivel base 30 with the support disc, the round wheel and the connecting frame is an optimal implementation of the present disclosure, which can reduce the production cost.

As a further preferred embodiment of the present disclosure, the keyboard body 10 is a Bluetooth keyboard body to facilitate connection of the Bluetooth keyboard body 10 to the tablet PC via Bluetooth wireless means.

The above embodiments are only preferred embodiments of the present disclosure, which cannot be used to limit the scope of protection of the present disclosure. Any non-substantial changes and substitutions made by a person skilled in the art on the basis of the present disclosure are within the scope of protection claimed by the present disclosure.

What is claimed is:

1. A Bluetooth keyboard with a protective case for a tablet PC, comprising a keyboard body, a protective case for fixed installation of the tablet PC, a swivel base, and a locking member; wherein
    the keyboard body is provided with a positioning sleeve, a lower end of the swivel base is configured to be rotatably inserted in the positioning sleeve and rotatable relative to the positioning sleeve around a first axis of rotation;
    the positioning sleeve is provided with a plurality of inset slots arranged in a circular pattern around the first axis of rotation, and the swivel base is provided with a mounting slot;
    the locking member is removably mounted in the mounting slot and is configured to be embedded in the inset slots;
    the mounting slot is fitted with a resilient element, the resilient element against on the locking member and is configured to provide a resilient force to move the locking member toward the positioning sleeve;
    the protective case is provided with a supporting member, the supporting member being configured to be rotatably mounted on the swivel base and rotatable relative to the swivel base about a second axis of rotation; and
    the first axis of rotation is a vertical axis, and the first axis of rotation is configured to be perpendicular to the second axis of rotation.

2. The Bluetooth keyboard according to claim 1, wherein the locking member is a locking pin, the locking pin being configured with a pin head having a triangular cross-section and being embedded in the inset slots, and the inset slots having a shape matching a shape of the pin head.

3. The Bluetooth keyboard according to claim 1, wherein the locking member is a marble.

4. The Bluetooth keyboard according to claim 1, wherein the positioning sleeve forms a plurality of abutting portions, and each of the plurality of abutting portions is formed by a portion of the positioning sleeve located between any two adjacent inset slots for abutting the locking member;
    wherein, during rotation of the swivel base:
        when the locking member moves from an inset slot to an adjacent abutting portion, that abutting portion pushes the locking member back into the mounting slot, thereby compressing the resilient element; and
        when the locking member moves from the abutting portion to an adjacent inset slot, the resilient element expands, driving the locking member toward the positioning sleeve and embedding it in the corresponding inset slot.

5. The Bluetooth keyboard according to claim 1, wherein the resilient element is a spring, one end of the resilient element against on a slot wall of the mounting slot and the other end of the mounting slot against on the locking member.

6. The Bluetooth keyboard according to claim 1, wherein an end of the keyboard body provided with the positioning sleeve is configured to protrude outwardly relative to the protective case.

7. The Bluetooth keyboard according to claim 1, wherein the supporting member comprises a support shaft fixed to the protective case, the support shaft is provided with a limit part and a limit member, the swivel base is provided with an engaging lug, the support shaft is configured to be rotatably inserted on the engaging lug and the engaging lug is configured to be clamped between the limit part and the limit member, and a central axis of the support shaft is formed as the second axis of rotation.

8. The Bluetooth keyboard according to claim 7, wherein the limit member comprises a fastener attached to the support shaft in a detachable manner, and a plurality of resilient washers mounted on the support shaft and located between the engaging lug and the fastener.

9. The Bluetooth keyboard according to claim 8, wherein the limit member further comprises a first washer and a second washer sleeved on the support shaft, the first washer is located between the engaging lug and the resilient washers adjacent thereto, and the second washer is located between the fastener and the resilient washers adjacent thereto.

10. The Bluetooth keyboard according to claim 1, wherein the keyboard body is a Bluetooth keyboard body.

11. The Bluetooth keyboard according to claim 1, wherein in an operation state for adjusting a target angle of the tablet PC, the protective case and the swivel base are pushed around the first axis of rotation, so that the swivel base rotates around the first axis of rotation within the positioning sleeve, and the locking member rotates with the swivel base;

when the swivel base rotates to the target angle, the locking member moves toward the positioning sleeve under the resilient force of the resilient element and is configured to be embedded in a corresponding one of the inset slots, so that the protective case and the tablet PC remain at the target angle.

12. The Bluetooth keyboard according to claim 1, wherein the mounting slot extends radially along the swivel base.

* * * * *